UNITED STATES PATENT OFFICE.

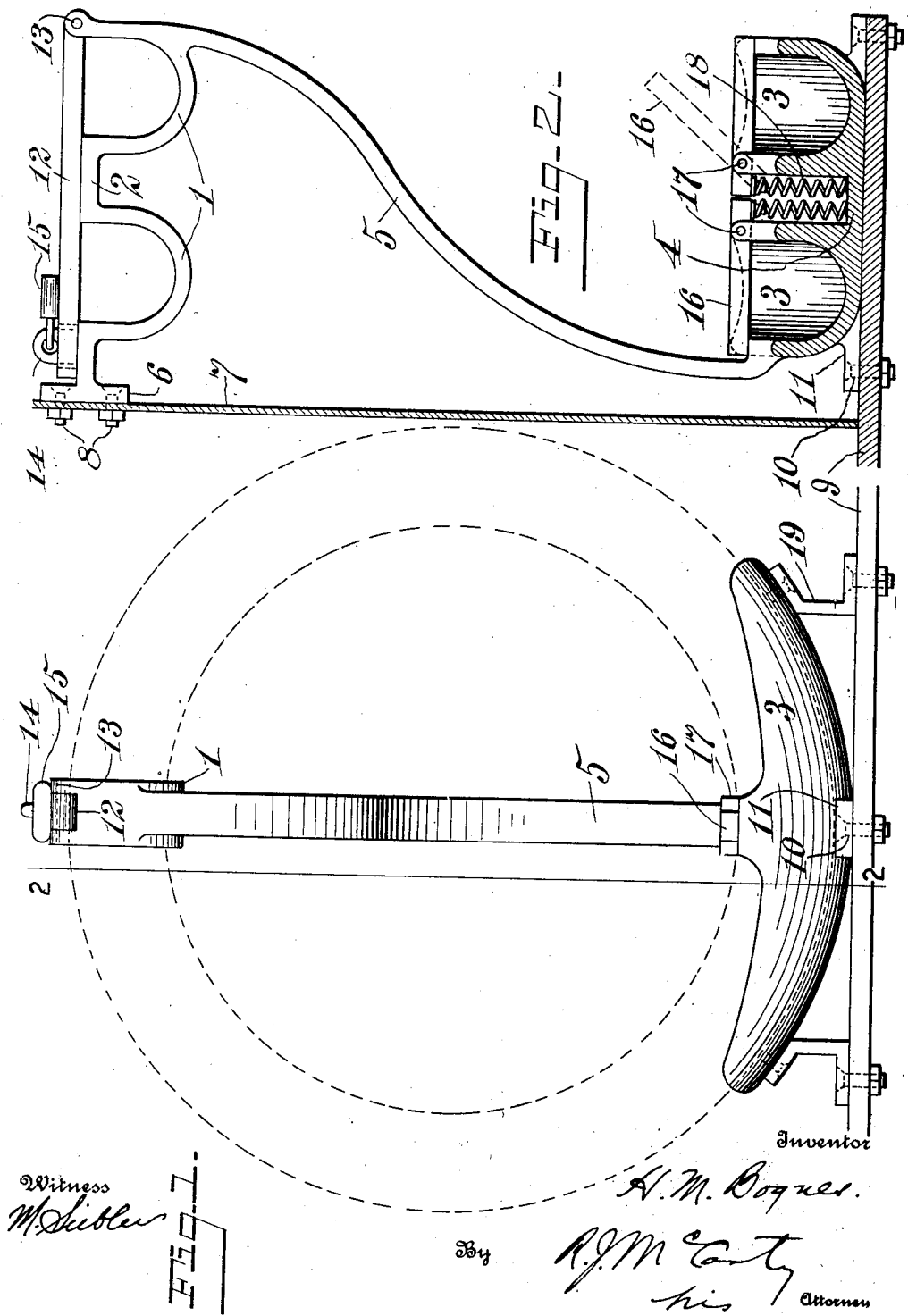

HAROLD M. BOGNES, OF DAYTON, OHIO.

AUTOMOBILE-TIRE HOLDER.

1,376,739.  Specification of Letters Patent.  Patented May 3, 1921.

Application filed May 24, 1920. Serial No. 383,743.

*To all whom it may concern:*

Be it known that I, HAROLD M. BOGNES, a citizen of the United States, residing at Dayton, in the county of Montgomery and State of Ohio, have invented certain new and useful Improvements in Automobile-Tire Holders, of which the following is a specification.

This invention relates to improvements in automobile tire holders.

More particularly speaking the invention relates to holders applicable to automobiles for holding spare tires or emergency tires.

The object of the invention is to provide a tire holder which is of a rigid character and is therefore capable of withstanding the vibrations transmitted to it through the weight of the load and the moving car.

A further object of the invention is to provide a tire holder which prevents the tires held from shifting in their positions.

In carrying out the above objects means are provided for attaching the upper receiving part to the side of the automobile, for example the forward side which is usually termed the "blind door," and the lower receiving part to the running board, and providing a brace or connection between the two receiving parts of the holder. And in further providing the lower receiving part in the form of saddles or curved receiving parts to receive a substantial part of the circumference of the tires, as will hereinafter more fully appear from the description to follow in connection with the accompanying drawings.

Referring to the drawings in brief terms Figure 1 is a side elevation of my improved tire holder showing a tire in dotted lines supported therein. Fig. 2 is a partial sectional view at a right angle to Fig. 1 or on the line 2—2 of Fig. 1.

In a more particular description of the invention similar reference characters designate corresponding parts.

The holder as illustrated in the drawings is capable of supporting two tires. It consists of an upper holder consisting of two semicircular parts —1— integrally joined by a part —2—, and two lower receiving parts consisting of two saddles or curved members —3—3— which are integrally joined at —4—. These two receiving parts are joined by a brace —5— which is preferably integral with the upper and lower receiving parts and extends from the outer end of the upper receiving parts to the inner side of the lower receiving parts. The upper receiving part has a flange —6— on its inner end which is united to the side of the automobile, for example the blind door —7—, said connection being of a firm character and it consists of bolts —8— which receive nuts and are thereby tightened rigidly. The lower receiving members consisting of the saddles —3—3— are shaped to conform to the curvature of the tire which is shown in dotted lines in Fig. 1. This lower receiving portion is rigidly secured to the running board —9— by means of bolts —10— which pass through ears or projections —11— which extend from the front and rear sides of the saddles. Owing to the upper and lower receiving portions being joined by a brace —5— the device is easily placed in position, the lower portion being secured, as stated, to the running board —9— and the upper portion to the side of the automobile or the blind door as before stated. Owing to the two parts being thus braced and rigidly connected to the running board and side of the automobile the device is of a most rigid character and the tires supported therein are prevented from jarring the holding parts and loosening them more or less. The automobile tires are placed in position in the respective holders, as will be seen from Fig. 1, that owing to the length of the saddles —3—3—, the said tires will be prevented from turning in the lower supports. The upper holding members are provided with a keeper in the form of a plate —12— which is hinged at —13— to the outer end of said holder and is provided on its inner end with an opening through which an eye —14— passes. When the plate or bar —12— is closed over the top of the upper holder to permit the eye —14—to be exposed thereabove the hasp of a pad lock may be passed through said eye and the bar —12— locked into closed position. The lower receiving members or saddles —3—3— are likewise provided with bars —16—16— which close over the central part of said saddles and thus the tires are secured in position. The lower bars —16—16— are pivoted at —17— and are held in their closed positions by coil springs —18— which are seated in a recess between the two saddles and exert their upward pressure against the adjacent ends of the bars to keep them in a closed position. In removing a tire from the holder the retaining bars —16—16— are raised against the force of their respective springs. The ends of the saddles —3—3— or lower receiving members seat upon brackets —19— which are secured to the running board of the automobile.

It will be seen that the holder as an entity is of a most firm and rigid character both in respect to its attachment to the running board and side of the automobile but also with respect to the intervening brace between the upper and lower portions of the holder. This brace it will be seen extends from the outer side or end of the upper portion of the holder and unites with the inner side or end of the innermost saddle —3—. The connection therefore supports the upper holder or braces it at the point where the support is much needed and extends inwardly so as to avoid preventing the placement of the tires in position.

Having described my invention, I desire to claim:

1. A tire holder adapted to be mounted on the side of an automobile, comprising an upper receiver, and a lower receiver consisting of two saddles, said upper and lower receivers being integrally united by a brace which extends from the outer end of the upper receiver to the inner side of the innermost lower saddle or receiver, the upper receiver being attachable at its inner end to the side of the automobile, and the lower receiver being attachable to the running board of the automobile, the upper receiver having means for locking the tires in the receiver, and the lower receiver having means for inclosing the lower portions of the tires in said saddle.

2. A holder for extra tires, comprising pairs of upper and lower shoes adapted to receive tires, a brace extending from the outer side of the upper shoes to the inner side of the lower shoes and firmly supporting said upper shoes, means for locking the tires in the upper shoes, pivotal retaining bars inclosing said tires in the lower shoes, said retaining bars being extended beyond their pivots, and springs seated between the lower shoes and engaging the extended ends of the retaining bars whereby said retaining bars are held in their closed position.

In testimony whereof I affix my signature.

HAROLD M. BOGNES.